Sept. 5, 1944. J. W. CARNAHAN 2,357,501
GLASS FORMING MACHINE
Filed Oct. 14, 1941 9 Sheets-Sheet 1

Fig.1.

Inventor
John W. Carnahan
By
Eulester + Eulester
Attorneys

Sept. 5, 1944.    J. W. CARNAHAN    2,357,501
GLASS FORMING MACHINE
Filed Oct. 14, 1941    9 Sheets-Sheet 3

Inventor
John W. Carnahan

Sept. 5, 1944.    J. W. CARNAHAN    2,357,501
GLASS FORMING MACHINE
Filed Oct. 14, 1941    9 Sheets-Sheet 6

Inventor
John W. Carnahan

Sept. 5, 1944.  J. W. CARNAHAN  2,357,501
GLASS FORMING MACHINE
Filed Oct. 14, 1941  9 Sheets-Sheet 7

Inventor
John W. Carnahan

Sept. 5, 1944.     J. W. CARNAHAN     2,357,501
GLASS FORMING MACHINE
Filed Oct. 14, 1941     9 Sheets-Sheet 8

Inventor
John W. Carnahan

Patented Sept. 5, 1944

2,357,501

UNITED STATES PATENT OFFICE 2,357,501

GLASS FORMING MACHINE

John W. Carnahan, Wheeling, W. Va., assignor to Hazel-Atlas Glass Company, Wheeling, W. Va., a corporation of West Virginia Application October 14, 1941, Serial No. 414,951

12 Claims. (Cl. 49—9)

The invention relates to a wholly automatic glass forming machine for manufacturing hollow glass articles, such as glass containers, and more particularly it relates to a press and blow machine of the telescoping mold type in which two glass charges are simultaneously delivered to two molds, and in which the glass charges are thereafter dually operated upon throughout the entire operation of the machine, to thereby simultaneously produce two completed glass articles.

One of the objects of the invention is to provide a telescoping mold type of glass forming machine in which it is possible to simultaneously form two glass articles of widely different weights and shapes.

Another object of the invention is to provide a machine of the telescoping mold type which will very materially increase the rate of production of glass articles, substantially twofold, and without any increase of personnel.

A further object of the invention is to increase the efficiency of the glass melting tanks, by providing a materially increased production, for the same number of forming machines per tank, so that the tank will be continuously operated at its full capacity.

Various other objects and advantages of the invention will be apparent to those skilled in the art, from the following detailed description, when taken in connection with the accompanying drawings, in which.

Figures 3, 4:
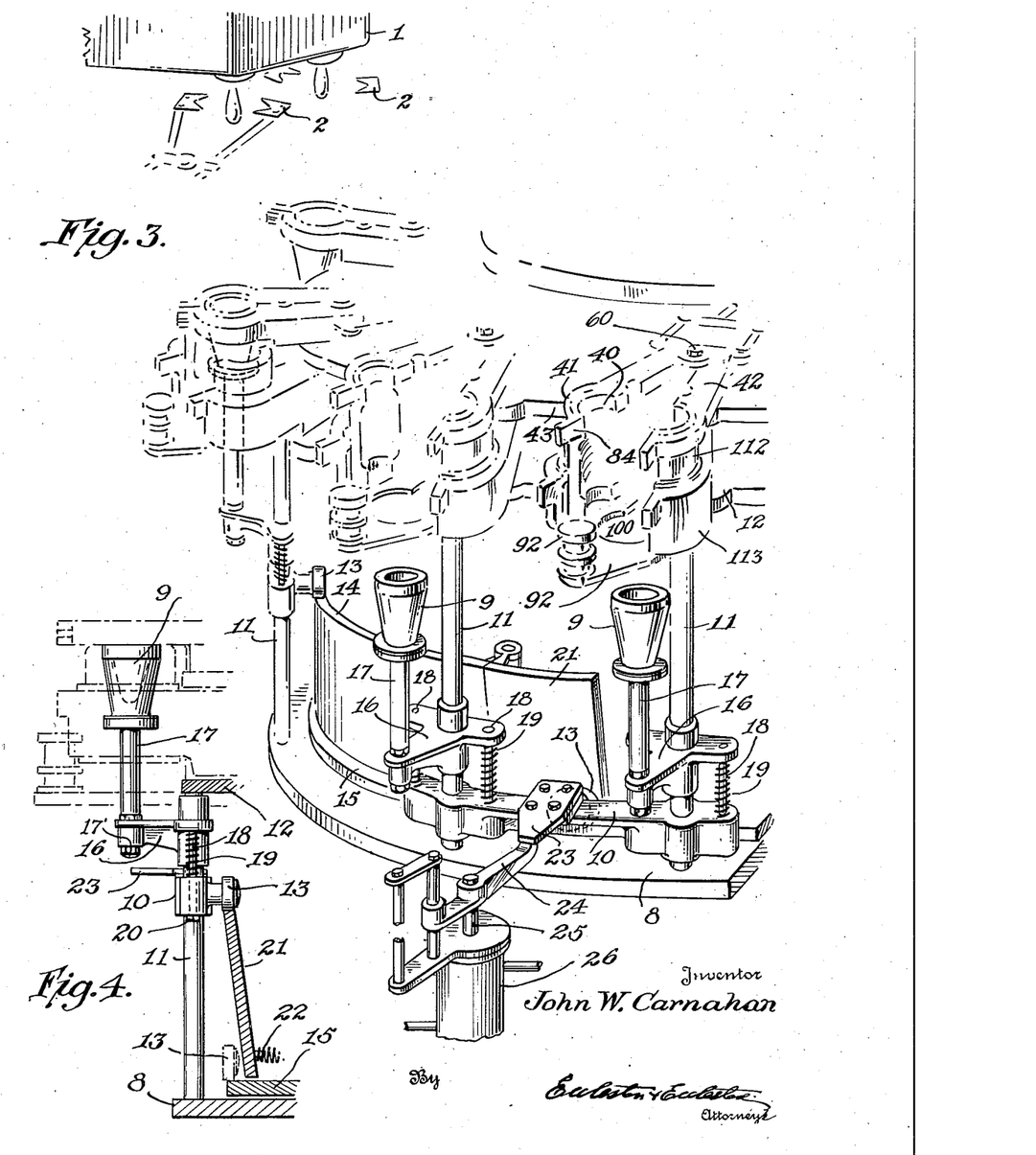
Figure 3 is a perspective view illustrating the mechanism for simultaneously elevating two parison molds into cooperative relation with the neck rings.
Figure 4 is a detail view illustrating a parison mold in elevated position.

Referring to the drawings in more detail, and particularly to Figure 3, numeral 1 indicates a flow spout leading from a glass melting tank. The flow spout is provided with two orifices from which two glass charges are delivered by glass feeders of any desired type, and simultaneously severed by the shears 2.

These glass charges, or gobs, drop into two parison or block molds, of an intermittently rotated glass forming machine. The particular feeding mechanism for delivering two gobs simultaneously to the parison molds of the forming machine does not, per se, form a part of the present invention, and therefore it is unnecessary to illustrate or describe the feeding means in any detail.

Figure 1:
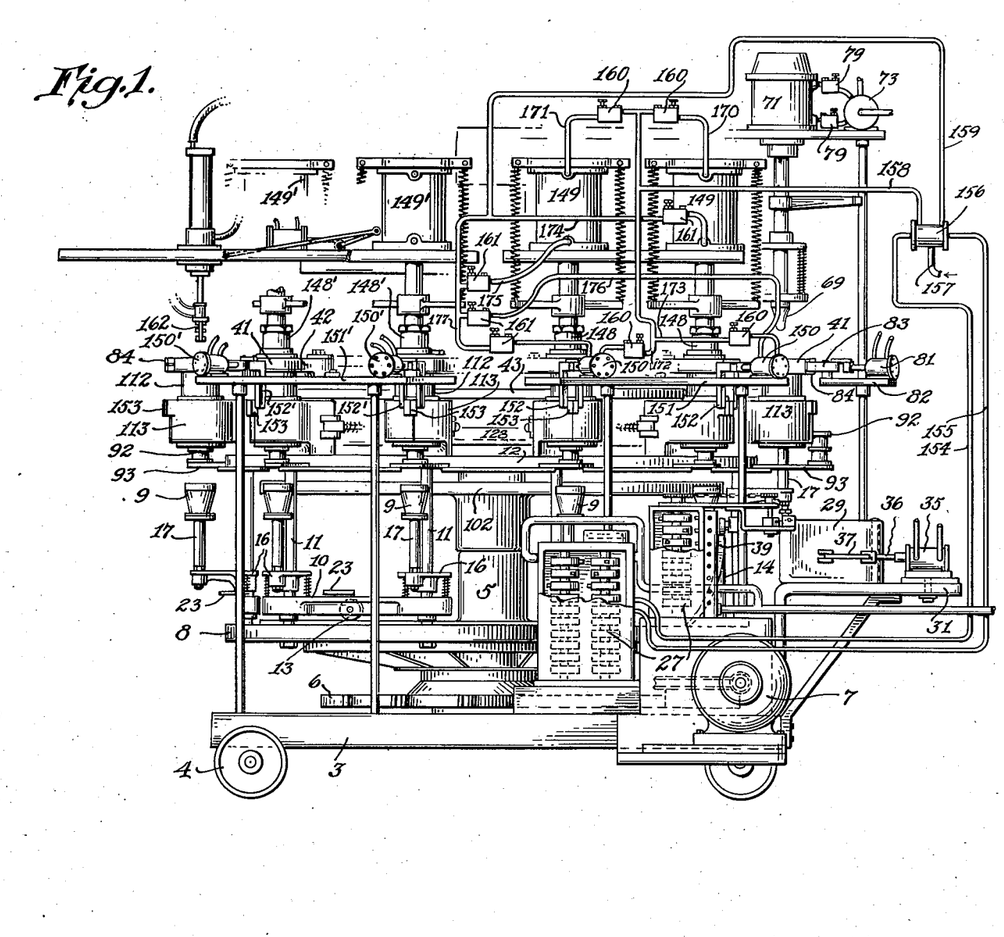
Figure 1 is a side elevational view of the machine.
Figure 2:
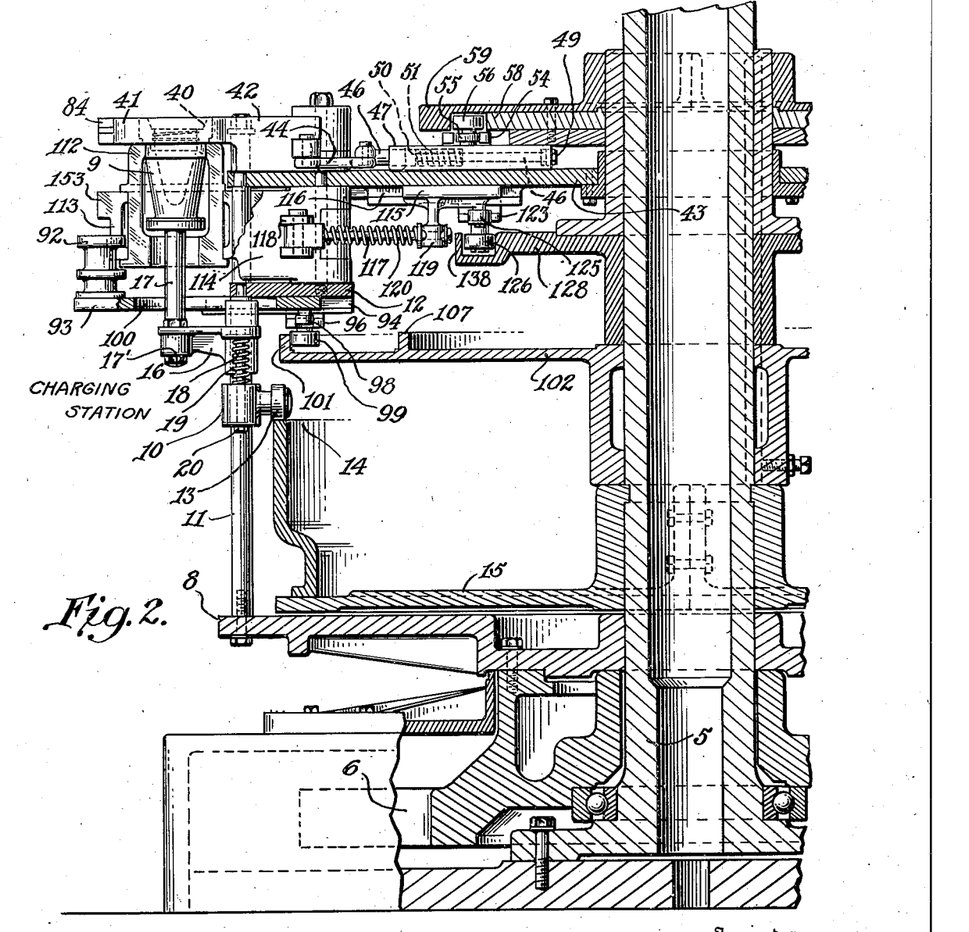
Figure 2 is a vertical sectional view of the machine, taken at the charging station; the charging station being indicated on Figures 6 and 18.

The new double unit press and blow machine, of the telescoping mold type, may be mounted on a carriage 3, having wheels 4, as shown in Figure 1. A central stationary pedestal 5 carries various rotating and stationary parts of the machine, as shown in Figure 2, and the lower end of the pedestal supports the Geneva wheel 6. This Geneva wheel is rotated step by step, in the well known manner, by a motor 7. Attached to and intermittently rotated by the Geneva wheel is the table 8, which table is connected with other rotatable parts of the machine. As indicated hereinbefore, this machine employs double units. That is, there are two parison molds operated as a unit, two neck rings operated as a unit, two blow molds operated as a unit, etc. In the embodiment illustrated herein, there are six of these doubles units, but of course there may be a greater or lesser number of units, as desired.

The parison mold units, which receive the glass charges, will first be described; reference being had particularly to Figures 1 to 5.

Numeral 9 indicates the parison molds which, at the lifting station, are elevated through the open blow molds to the level of the neck rings. The neck rings are then closed, the charges are delivered, and these charges are formed into glass parisons by a pressing operation. After the parisons are formed, the parison molds are lowered out of the way and the blow molds are closed, after which the parisons are formed into the completed articles by blowing operations.

In the particular machine illustrated, there are six double parison mold units, but as all of these units are of the same construction, a description of one of the units will be sufficient. Numeral 10 indicates a yoke which is mounted for vertical sliding movement on two standards 11 which connect the rotatable table 8 with the blow mold supporting ring 12.

The yoke 10 carries a roller 13 which rides on the top of a track 14 when the parison molds are in elevated position; the track being mounted on a stationary plate 15 carried by the central pedestal 5.

Above the yoke, and on the standards, are slidably mounted brackets 16. Removably attached to each bracket is an upstanding rod 17, and to the upper end of each rod is attached one of the parison molds 9. Of course parison molds of different size and shape will be employed, depending upon the particular article to be manufactured.

The brackets 16 are connected to the yoke 10 by means of pins 18. These pins are fixed to the brackets, but are slidably mounted in the yoke. Coil springs 19, mounted on the pins, urge the brackets upwardly, and nuts 20 on the lower ends of the pins limit the upward movement of the bracket relative to the yoke. Thus when the yoke is lifted, if a parison mold strikes an obstacle, the upward movement of the parison mold will stop while the upward movement of the yoke continues, thereby preventing breakage of parts.

Hingedly attached to the forward end of the track 14 is a track section 21. As best shown in Figures 3 and 4, this track section is inclined outwardly from bottom to top, and the section is urged outwardly, into alignment with the track 14, by means of a coil spring 22. As each pair of parison molds approaches the mold lifting station, the roller 13 of the yoke 10 passes under the outwardly inclined track section 21. Thus when the yoke is lifted, the roller will swing the track section inwardly against the pressure of the spring 22.

Mounted centrally of each yoke 10, and extending outwardly therefrom, is a finger 23. When each yoke stops at the mold lifting station, this finger is positioned over a bracket 24 carried by the piston rod 25 of a cylinder 26. This cylinder is operated by air pressure, and its operation, in proper timed relation with the forming machine, is controlled by a timer 27.

When air pressure is admitted to the lower end of the cylinder, the bracket 24 by engagement with the finger 23 will lift the yoke and thereby elevate the parison molds to the level of the neck rings. As the yoke moves upwardly, the roller 13 swings the track section 21 inwardly, as previously described, and just as the roller clears the top of the track section, it will be swung outwardly into alignment with the track 14, by the spring 22. Thus in the next step by step rotation of the machine, the roller will travel onto the track 14 and the molds will be held in their elevated position while the glass charges are being delivered thereto, and during the pressing operation which forms the charges into glass parisons.

Figure 5:
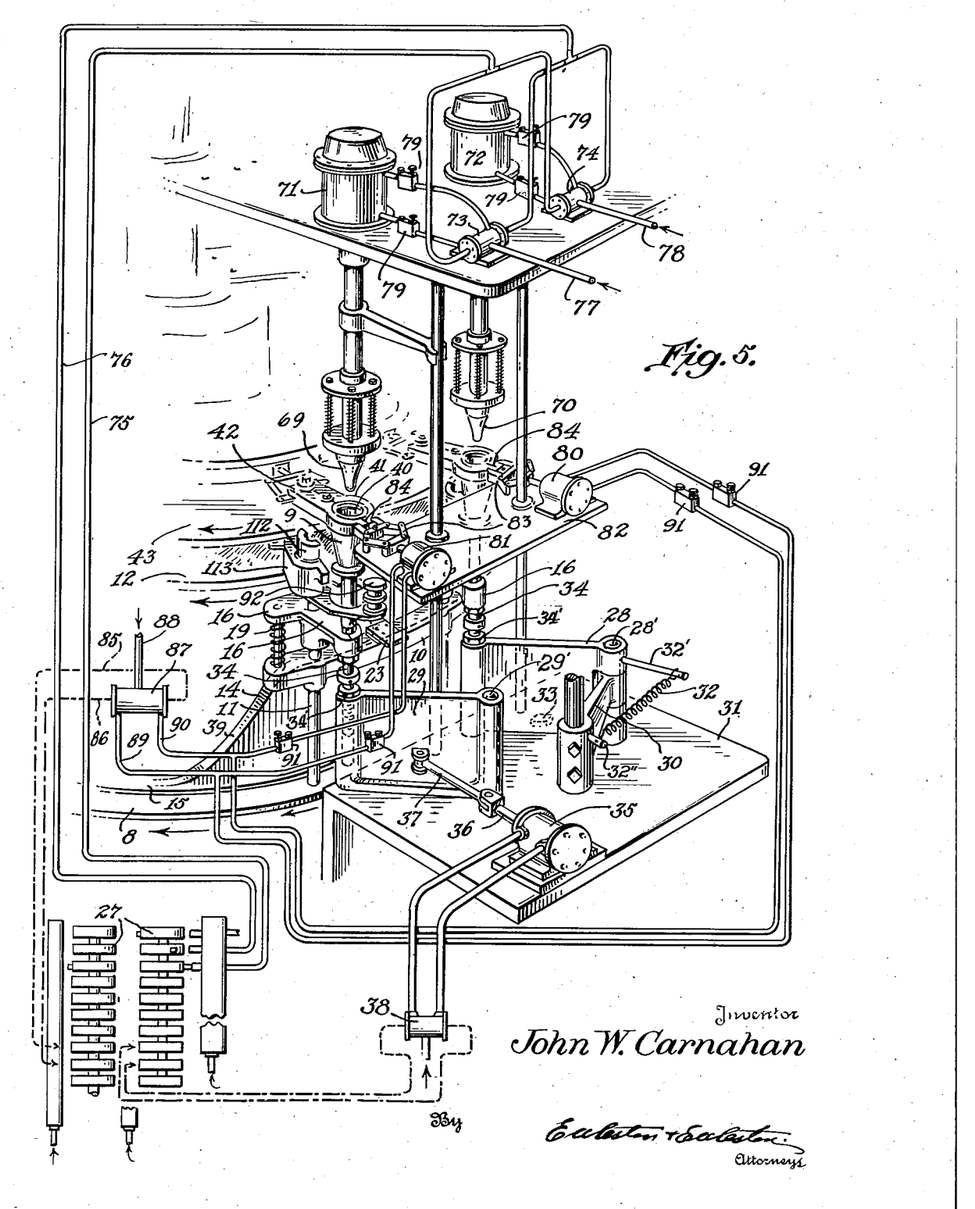
Figure 5 is a perspective view of the machine at the pressing station.

At the pressing station considerable downward pressure is exerted on the parison molds by the pressing plungers, and to assist in supporting the two molds at the pressing station, two separate anvils 28 and 29 are provided. These anvils, which are best illustrated in Figure 5, will now be described.

The forward anvil 28 is oscillatably mounted on a pin 28' in a bracket 30 carried by a stationary plate 31, and it is normally urged into its operative position by a coil spring 32 having its opposite ends attached to pins 32' and 32" carried by the anvil and bracket respectively. A lug 33 acts as a stop to properly position the anvil. If a parison mold should reach the anvil 28 without being elevated, it will merely swing the anvil out of the way, without any breakage or straining of parts, and the spring 32 will swing the anvil back into operative position. Each of the anvils carries at its upper end a finger 34 which is held in vertically adjusted position by a lock nut 24'. As each double unit of parison molds is brought to a stop at the pressing station, the rounded nuts 17' on the lower ends of the rods 17, which carry the parison molds 9, just clear the upper ends of the fingers 34, and the parts are in vertical alignment so that the anvils will carry some of the downward pressure exerted during the operation of pressing the glass parisons.

The rearward anvil 29 is also oscillatable, being mounted on a pin 29' carried by the plate 31, but it is periodically swung into and out of operative position by a cylinder 35, the piston rod 36 of which is connected to the anvil by a link 37. The operation of the cylinder, in proper timed relation with the operation of the forming machine, is controlled by the timer 27, which alternately admits air pressure to opposite ends of a spool valve 38, which controls the admission of air pressure to opposite ends of the cylinder 35. As the timer is of conventional construction, and is well known in the art, a description thereof is unnecessary.

As soon as the operation of pressing the glass parisons has been completed, the machine rotates another step, and the roller 13 which has been on top of the track 14, to support the parison molds in operative relation with the neck rings, now rides down an inclined portion 39 of the track 14, so that the parison molds descend by gravity, thus clearing the neck rings and blow molds, and leaving the glass parisons freely suspended by the neck rings. In this quick downward movement of the parison molds, the bracket 16 supporting the right hand parison mold (Fig. 5) of the unit, would strike the anvil 29, but just as the machine starts to rotate, the cylinder 35 operates to swing that anvil out of the path of the oncoming bracket, and as soon as the parison mold mechanism is clear, the cylinder is operated to swing the anvil back into operative position to support the next parison mold brought into position above it in the step by step operation of the machine.

Each double unit of parison molds is thus successively lowered out of the way, and they remain in that lowered position until they are again brought to the mold lifting station, where they are again elevated to the levels of the neck rings by the operation of the cylinder 26, as previously described.

A complete cycle of operation of the blank or parison molds has been described, and the operation of the neck rings will now be described.

The neck rings which are referred to by the numeral 40 are removably mounted in the usual neck ring cages 41 carried by arms 42 pivotally mounted at 42' on the table 43 which of course rotates with the table 8. Links 44 have one end pivotally attached at 44' to the arms 42, and the other ends are pivotally attached at 46" to a cross arm 45 carried by a rod 46. As the rods 46 are moved back and forth, radially of the table, the neck rings will be opened and closed. Of course the neck rings of each double unit are operated simultaneously. For this purpose, each rod 46 is connected to a slide 47 mounted in radially extending slideways 48 provided on the neck ring table.

The rods 46 may be attached to the slides 47 by any desired means, but in the preferred form illustrated, the rods extend entirely through the slides and the rear end of each rod is provided with a nut 49. The rod is reduced in diameter in the front end of the slide to form a shoulder 50, and a coil spring 51 is mounted on the reduced portion of the rod and extends from the shoulder to a suitable base 51' provided in the slide. Thus when the slides are moved outwardly to close the neck rings, breakage or straining of the parts will not occur if anything prevents the complete closing of the ring, for in that event the outward movement of the rod 46 will stop, while the outward movement of the slide 47 will continue against the pressure of the spring 51.

Numeral 52 refers to a yoke carrying slide which is also mounted in a suitable radially extending slideway provided on the neck ring table. There is a yoke carrying slide between each pair of neck ring slides 47, and a yoke 53 mounted on the top of the slide 52 extends laterally over the two adjacent neck ring slides 47. The yoke has its ends bifurcated, as indicated by the numeral 54, to engage rollers 55 provided on the tops of slides 47. By reason of this construction the rollers can move slightly inward and outward, in the bifurcated ends of the yoke, to take care of the relative lateral movement between the yoke carrying slide 52 and the neck ring slides 47, as the slides are moved back and forth, radially of the table, to close and open the neck rings.

Figures 6, 7:
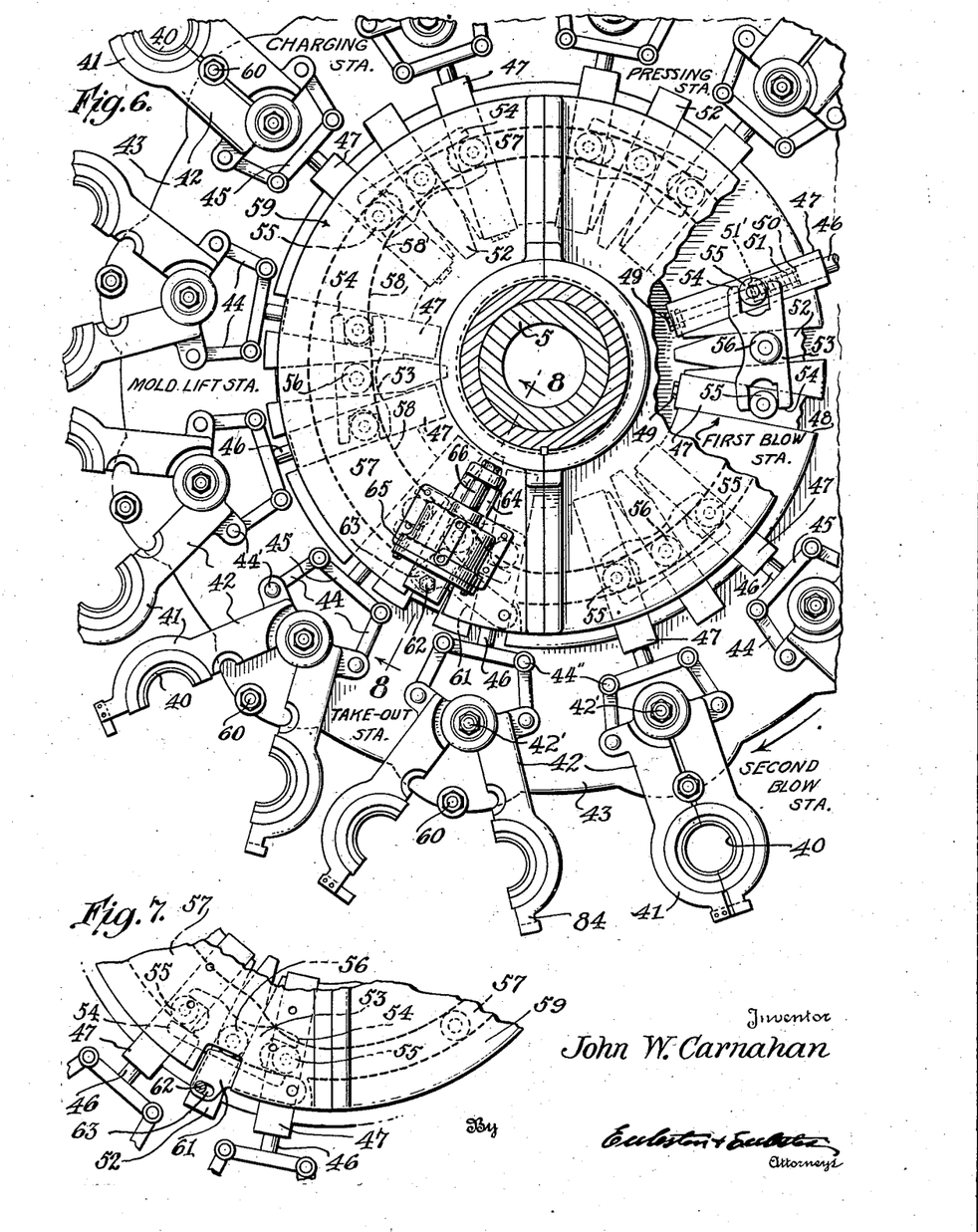
Figure 6 is a horizontal sectional view taken on Figure 1, above the neck rings, and illustrating the mechanism for opening and closing the neck rings.
Figure 7 is a detail view of the neck ring operating mechanism.

A roller 56 is mounted on the yoke 53, and this roller normally travels in a cam track 57 formed by a stationary cam 58 and a cam cover 59. As each double unit of neck rings is carried forward from the parison mold lifting station to the mold charging station beneath the glass feeders, the neck rings are closed by reason of the roller 56 riding outwardly in the cam track 57, as best shown in Figure 6. As the neck rings are closed they are properly centered by the centering pins 60.

At the charging station, with the parison molds raised, and the neck rings closed, a gob of glass of the proper weight is delivered to each of the molds, through the neck ring. As mentioned hereinbefore, the charges delivered to each of the molds of a unit may be of materially different weight, so that two articles of widely different weights and shapes may be manufactured at the same time by a single machine.

When the charges have been delivered to the parison molds, the machine is moved forward step by step, to bring the neck rings to the pressing station, the first blow station, the second blow station, and then to the take-out station where the completed articles are removed. The neck rings remain closed from the charging station to the take-out station, where they are quickly opened by mechanism now to be described.

Slightly in advance of the take-out station the cam 58 cuts sharply inward, as best shown in Figures 6 and 7, so that upon reaching the take-out station the roller 56 is free to move inwardly to open the neck rings. To accomplish a quick opening of the rings, the outer wall of the cam track 57, formed by the depending flange on the cam cover 59, is cut away at the take-out station, as indicated by numeral 59', Fig. 9, and a short cam section or lever 61 is pivotally mounted in its place.

Figure 8:
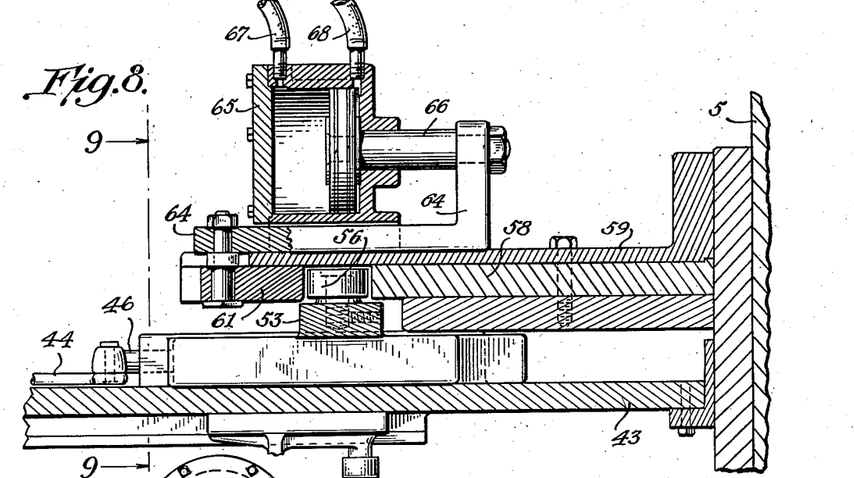
Figure 8 is an enlarged vertical sectional view taken on line 8—8 of Figure 6.
Figures 9, 10:
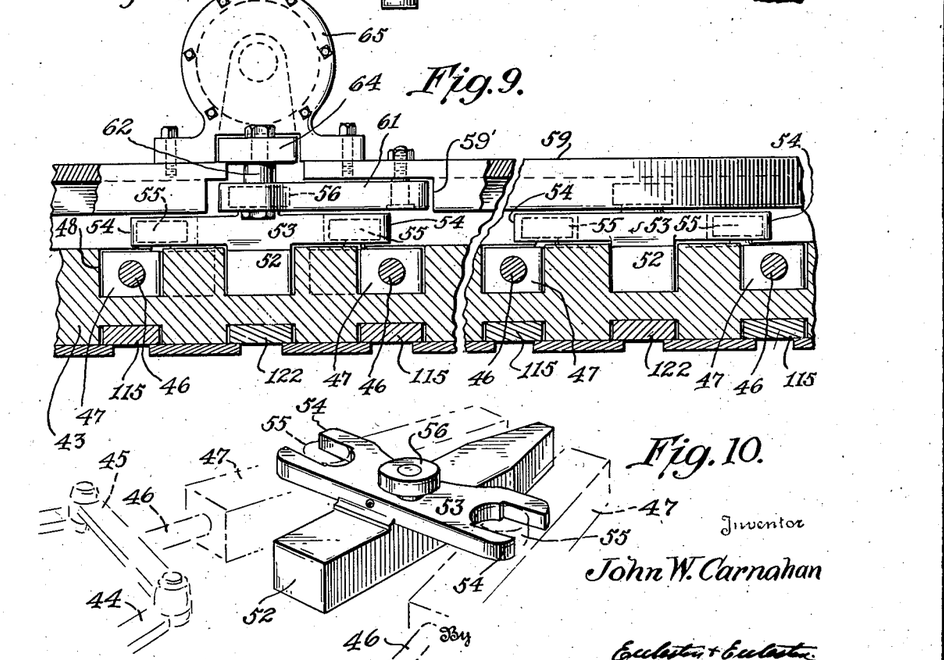
Figure 9 is a partial vertical sectional view taken on line 9—9 of Figure 8.
Figure 10 is a detail perspective view of one of the yokes and its carrying member, by which the neck ring slides are connected.

As each double ring unit reaches this station, with the neck rings closed, the roller 56 on top of the yoke 53 comes to a stop on the inner face of the lever 61, as shown in Figure 7. To quickly open the neck rings, it is only necessary to swing the lever inwardly, to the position shown in Figure 6. To swing the lever or hinged cam section inwardly and outwardly, a pin 62 is carried in a slot 63 provided in the free end of the lever, and this pin is attached to the outer end of a reciprocable arm 64. This arm passes under a cylinder 65 and has its inner end attached to the piston rod 66 of the cylinder, as shown in Figures 6, 8 and 9. Air pressure lines 67 and 68, Figure 8, lead to opposite ends of the cylinder 65, and the admission of air pressure to the cylinder, in proper timed relation, is controlled by the timer 27.

When the piston rod 66 of the cylinder 65 is moved to the right (Fig. 8), the lever 61 is swung from its outer position shown in Figure 7, to its inner position shown in Figure 6, thereby moving the roller 56 and yoke 53 inward to open the neck rings. The roller 56 is now against the cam 58 and in subsequent step by step movements of the machine, it will be moved outwardly by the outwardly curved portion 58' of the cam, to thereby close the neck rings when they reach the charging station, as previously described. As soon as the roller 56 rides off the lever 61, it is swung back to its outer position, shown in Figure 7, by the admission of air pressure to the inner end of the cylinder 65. The lever is now ready to receive the roller 56 of the next double neck ring unit, and the operation is repeated.

The preferred means for closing the two neck rings of each unit as the units successively approach the charging station, and the preferred means for quickly opening the two neck rings of each unit as the units successively reach the take-out station, have been described. The simultaneous pressing of two glass charges to form parisons will now be described; reference being had particularly to Figure 5.

When each double unit reaches the pressing station, the parison molds are in elevated position, the neck rings are in closed position cooperating with the parison molds, and the glass charges are in the molds. Pressing plungers 69 and 70 are arranged over the two molds, at the pressing station, and the plungers are operated by cylinders 71 and 72. The operation of the cylinders in proper timed relation with the operation of the machine, is controlled by the timer 27. Spool valves 73 and 74 are provided adjacent the cylinders 71 and 72, respectively. An air line 75 leads from the timer to one end of each of the spool valves, and another air line 76 leads from the timer to the opposite ends of these valves. When air pressure is admitted to one of the lines, both valves will be shifted in the same direction to admit pressure to the same ends of the cylinders 71 and 72, from lines 77 and 78, which lead from a suitable source of air pressure. Thus the cylinders are simultaneously operated to force the plungers 69 and 70 downwardly to press the parisons in the two neck rings and parison molds, and are simultaneously operated to lift the plungers. By-pass valves 79 are preferably provided in the lines which lead from each spool valve to the upper and lower ends of the cylinders 71 and 72. By the adjustment of these valves, the time of operation of the cylinders 71 and 72 can be independently varied to a slight extent, so that the movement of the two pressing plungers can be made to be exactly simultaneous, in the event a slight variation in the time of operation of the plungers should occur, due to any differences in the cylinders, or in the air lines, or for any other reason.

But before the pressing plungers are operated to press the parisons, it is necessary that the neck ring halves be firmly locked together. For this purpose, small cylinders 80 and 81 are mounted on a stationary platform 82, adjacent the pressing station. Each of the cylinders operates a mechanism 83 to clamp jaws tightly against outwardly extending lugs 84 provided on the cages 41 which carry the neck ring halves 40, as shown in Figure 5.

The operation of the cylinders 80 and 81, in proper timed relation with the machine, is controlled by the timer 27. Air lines 85 and 86, indicated by dotted lines in Figure 5, lead from the timer to the opposite ends of a spool valve 87, to shift the valve in opposite direction, thereby admitting air pressure from a line 88 leading from any desired source of air under pressure, alternately to lines 89 and 90, which lead to the cylinders for clamping the neck rings closed. Each of the lines 89 and 90 is divided, so that one line communicates with the rear end of each of the cylinders, and the other line communicates with the forward end of each of the cylinders. It will be understood, of course, that in all cases the lines which deliver air pressure from spool valves to cylinders also withdraw the pressure from the cylinders and exhaust it to the atmosphere through an opening (not shown) in the spool valves, which valves are old and well known in the art.

Each of the branch lines leading from the lines 89 and 90 to the clamping cylinders 80 and 81, is preferably provided with a by-pass valve 91. By the adjustment of these valves the clamping mechanisms can be caused to operate at exactly the same instant, if there should be any slight variation in their time of operation.

After the two parisons have been pressed, the pressing plungers are raised, and the neck rings are unlocked but remain closed by reason of the roller 56 riding on the cam 58. The molds are now indexed to the next station, which is the first blow station, and when this indexing movement starts the roller 13 rides down the inclined portion 39 of the track 14, whereby the parison molds 9 are lowered out of the way, leaving the glass parisons suspended from the neck rings, and the blow molds 112 remaining open.

During the movement from the pressing station to the first blow station, the blow mold bottoms are moved inwardly to operative position, and at the first blow station the blow molds are closed. The mechanism for sliding the mold bottoms in and out, and the mechanism for closing and opening the blow molds, will now be described before describing the blowing operations.

Figures 18, 19, 20:
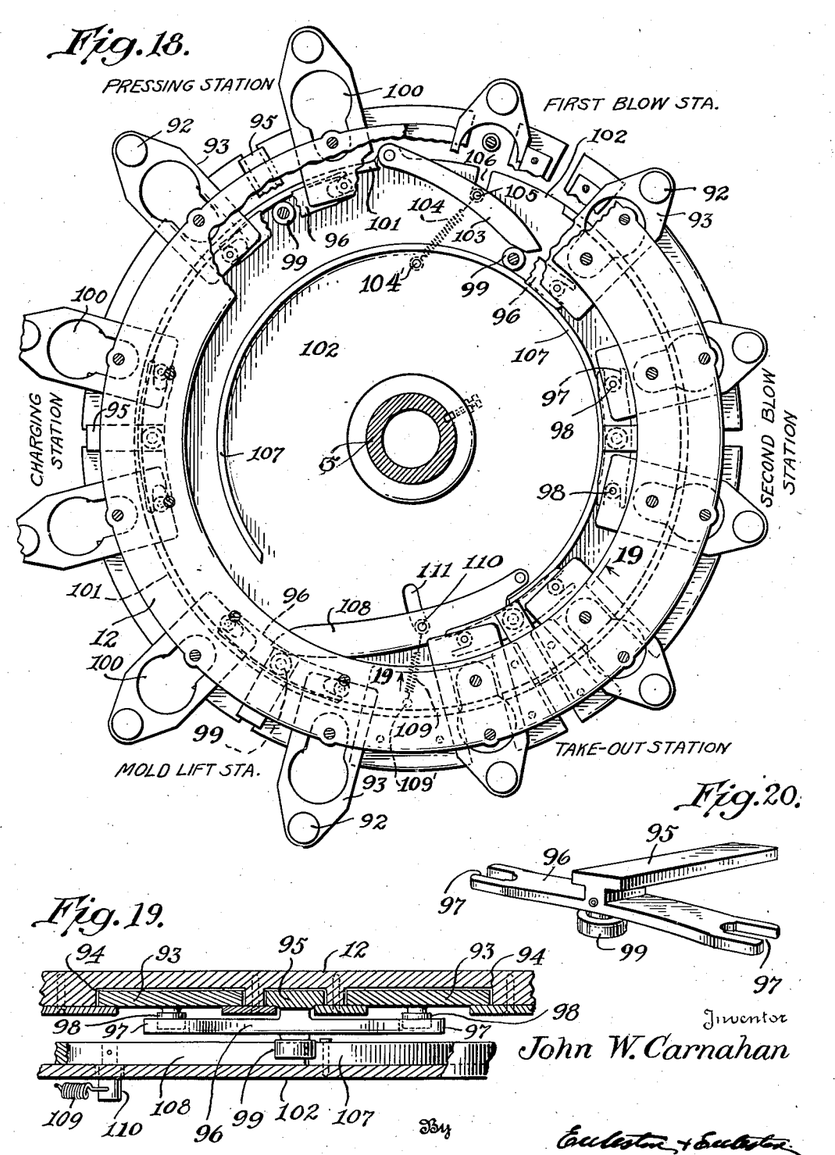
Figure 18 is a sectional view, with parts broken away, of the mechanism for moving the blow mold bottoms inward and outward.
Figure 19 is an enlarged vertical sectional view taken on line 19—19 of Figure 18.
Figure 20 is a detail perspective view of the yoke member for connecting the blow mold bottoms.

The blow mold bottoms are indicated by numeral 92, and the mechanism for operating them is best shown in Figures 18, 19 and 20. Each mold bottom is carried by a bottom slide 93; the slides being mounted in appropriate radially extending slideways 94 in the lower side of the blow mold supporting ring or table 12. A yoke slide 95 is also mounted in a similar slideway, between each pair of mold bottom slides.

The yoke slide has on its under side a yoke 96 which extends laterally below the two adjacent mold bottom slides, and the ends of the yoke are bifurcated, as indicated by numeral 97, to engage a roller 98 extending downwardly from each of the mold bottom slides. As the mold bottom slides and the yoke slide move outward and inward, the lateral distance between them varies, and this is taken care of by mounting the slide rollers 98 in the bifurcated ends of the yoke.

Extending downward from the under side of the yoke is a roller 99 which, by engagement with cams 108 and 103, moves the two mold slides and the mold bottoms outward and inward. As shown in Figure 18 the mold bottoms and slides are in their outward or inoperative position from the parison mold lifting station to and including the pressing station. And of course the mold bottom slides are provided with suitable openings 100 through which the parison molds are raised and lowered.

While the mold bottoms are passing from the parison mold lifting station to the pressing station, the roller 99 rides along a ring 101 carried by the stationary plate 102 mounted on the central pedestal 5. Between the pressing station and the first blow station a cam 103 is pivotally mounted on the plate 102, and is normally urged inward by a coil spring 104 having one end attached at 104′ to the under side of the plate and the other end attached to a pin 105. This pin, which is carried by the cam, projects downwardly through a slot 106 provided in the plate. This slot limits the inward movement of the cam. Thus when the unit moves from the pressing station to the first blow station, the two mold bottoms are quickly moved inwardly to operative position; the parison molds having been lowered out of the way by reason of the roller 13 riding down the inclined surface 39 of the track 14, as previously described. If any obstruction prevents the inward movement of the mold bottoms, the spring will give, thereby preventing any breakage or straining of parts.

The mold bottoms having been moved inwardly, the roller 99 now rests against a ring 107 carried by the plate 102. As soon as the mold bottoms are moved inward, the blow molds close and thereby lock the mold bottoms in place. The blow molds are opened at the take-out station, and the mold bottoms are moved outwardly between the take-out station and the parison mold lifting station.

For the purpose of moving the mold bottoms outwardly, a cam 108 is pivotally mounted on the stationary plate 102, and is normally urged outwardly by a coil spring 109 which has one end attached at 109' to the under side of the plate and the other end attached to a pin 110. This pin, which is carried by the cam, projects downward through a slot 111 provided in the plate. The slot limits the outward movement of the cam.

The blow molds and neck rings are open, and the completed articles have been removed, and as the units move from the take-out station to the parison mold lifting station, the pivotally mounted cam 108 causes the mold bottoms to move outwardly to inoperative position, with the roller 99 against the ring 101. The mold bottoms are held in their outward position under pressure of the cam 108 at the parison mold lifting station, as shown in Figure 18, and after the parison molds have been elevated at this station, the machine continues its step by step movement, with the mold bottoms remaining in their inoperative position until they again reach the pivotally mounted cam 103, by which they are moved inwardly to operative position, as previously described.

After the mold bottoms have been moved inwardly, the blow molds are closed at the first blow station, and remain closed until they reach the take-out station. The preferred mechanism for closing and opening the blow molds, will now be described, reference being had particularly to Figures 11 to 17.

The blow mold halves, indicated by numeral 112, are mounted in the usual cages 113 carried by arms 114 pivotally mounted on pins 114' which are mounted on the blow mold carrying ring 12. Associated with each blow mold is a slide 115 mounted in an appropriate slideway 116 provided on the under side of the neck ring table 43. Rods 117 have their outer ends pivotally attached to lugs 118 on the blow mold arms 114, and their inner ends are slidably and rockably mounted in bearings 119 on the slide 115. Coil springs 120 are mounted on the rods and urge the mold halves toward closed position; the forward movement of the rods relative to the bearings 119 being limited by nuts 121 on the rear ends of the rods. If an obstruction prevents the closing of a blow mold when a slide is moved outward, the slide will continue its movement but the rods will slide through their bearings, against the pressure of the coil springs.

For connecting two of the blow mold slides 115, so that two blow molds will be operated together, a yoke slide 122 is mounted in an appropriate slideway 122' on the under side of the neck ring table 43, between the slideways 116. A yoke 123 carried by the slide 122, extends laterally under the two adjacent blow mold slides 115, and the ends of the yoke are bifurcated, as indicated by numeral 124, to receive rollers 125 mounted on the under side of these slides. A roller 126 is carried on the under side of the yoke, and the two blow molds of each unit are closed and opened by the inward and outward movement of this roller.

As the blow molds approach the take-out station they are in closed position, and the roller 126 is riding against the cam 127 provided on the stationary cam plate 128 mounted on the central pedestal 5. When the two blow molds reach the take-out station it is desirable that they be opened quickly. For this purpose a reciprocable cam block 129 is provided at this station, as best shown in Figures 11 to 14.

Figures 12, 13, 14:
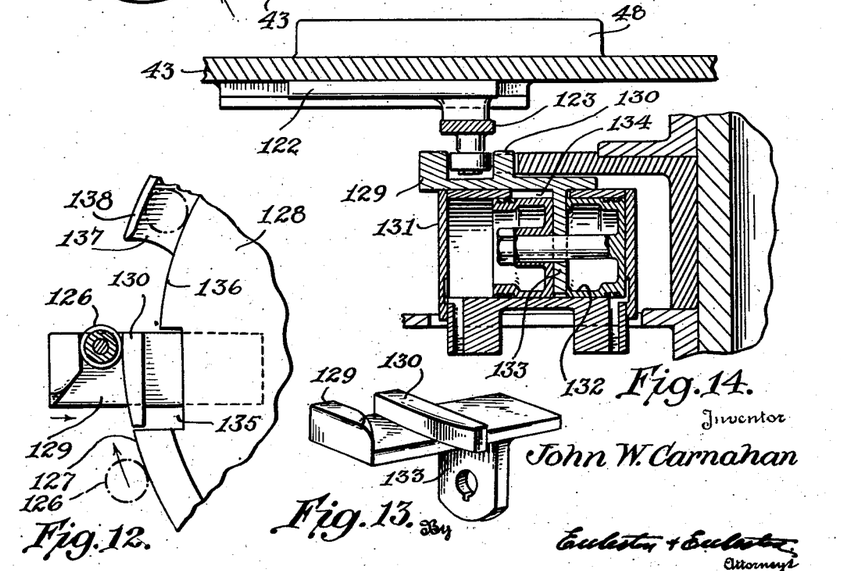
Figures 12 and 13 are a plan view and a perspective view, respectively, of the blow mold opening block.
Figure 14 is a fragmentary vertical sectional view taken on line 14—14 of Figure 11.
Figure 15:
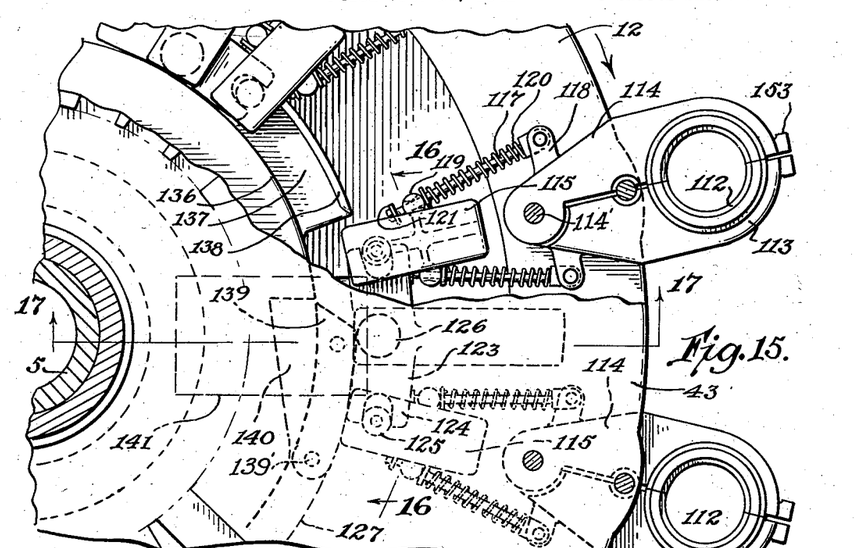
Figure 15 is a fragmentary sectional view taken on Figure 1, above the table, and showing the mechanism for closing the blow molds; the table being broken away to more clearly show the construction.
Figure 16:
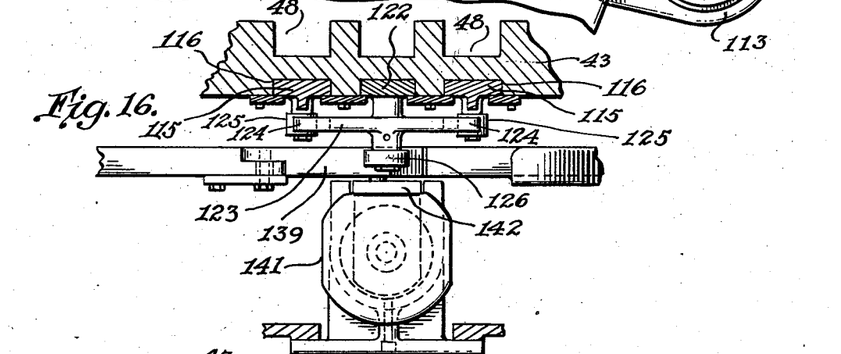
Figure 16 is a fragmentary vertical sectional view taken on line 16—16 of Figure 15.
Figure 17:
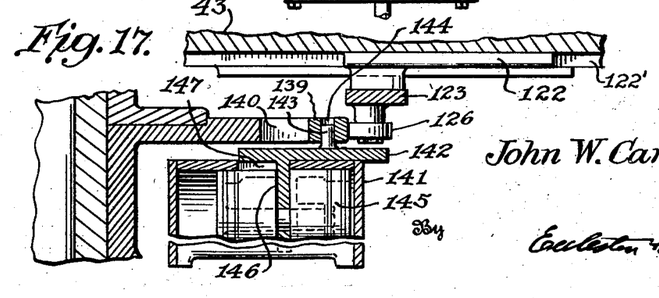
Figure 17 is a fragmentary vertical sectional view taken on line 17—17 of Figure 15.

The cam block is in its outward position when the closed blow molds approach the take-out station, and the roller 126 is riding on the cam 127 which is in alignment with the cam rail 130 on the cam block 129, as shown in Figure 12.

Just as the blow molds reach the take-out station the roller 12 rides onto the cam block and comes to a stop. This block is slideably mounted on the top of a cylinder 131, and is connected to the piston 132 of the cylinder by an arm 133 which extends downwardly from the cam block through an opening 134 in the cylinder wall.

As soon as the roller 126 reaches the cam block 129, air pressure is admitted to the outer end of the cylinder 131, whereby the block is snapped inwardly to open the blow molds, and thus permit the removal of the completed articles. Of course, the operation of the cylinder, in proper timed relation, is controlled by the timer 27.

Figure 11:
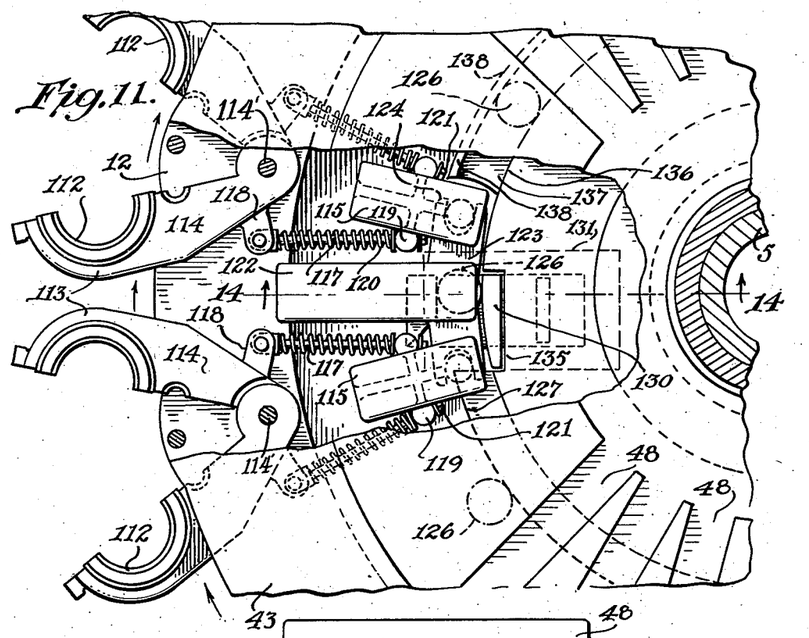
Figure 11 is a partial detail plan view, with parts cut away, of the mechanism for opening the blow molds.

When the cam block is moved to its inward position to open the molds, the cam rail 130 on the block fits into a pocket 135, and the face of the rail is in alignment with the cam 136 as shown in Fig. 11. Upon the next movement of the machine, the roller 126 passes from the cam block to the cam 136, and the blow molds are held in open position by the roller travelling in a cam track 137 formed by the cam 136 and the cam rail 138. When the roller has left the cam block 129, air pressure is admitted to the inner end of the cylinder 131, to move the block to its outward position, ready to receive the roller of the next double blow mold unit.

The blow molds remain open until they reach the first blow station. At this station the cam track 137 and cam rail 138 terminate, and a cam section 139 is pivotally mounted at 139' on cam plate 128, as shown by dotted lines in Figure 15.

This cam section when in its inward position fits into a pocket 140, with its outer face forming a continuation of the cam 136.

When the blow molds reach the first blow station the roller 126 rides onto the outer face of the pivoted cam 139 and comes to a stop. The cam is then snapped outward, to the position shown by dotted lines in Figure 15, to thereby snap the blow molds closed about the blow mold bottoms and about the glass parisons suspended from the neck rings.

The pivoted cam or lever 139 is swung outward and inward by a cylinder 141; the cylinder being operated in proper timed relation by the timer 27. For operatively connecting the cylinder and cam, a plate 142 is slidably mounted on the top of the cylinder. This plate is connected to the cam or lever by a pin 143 which projects upwardly into an opening 144 provided in the cam, and is connected to the piston 145 of the cylinder by an arm 146 which extends downwardly from the plate through an opening 147 in the cylinder wall.

When the blow mold unit leaves the first blow station the roller 126 rides from the face of the pivotally mounted cam 139 onto the cam 127, whereby the molds are retained closed until they again reach the take-out station where they are opened by the reciprocal cam block 129, as previously described.

The preferred means for sliding the blow mold bottoms in and out, and for closing and opening the blow molds, have been described, and the means for locking the blow molds closed, will now be described, reference being had particularly to Figure 1.

At the first blow station there are two blowheads 148, so positioned that they will be directly over the two molds of each unit, as the units are successively brought to this station. These blowheads are moved downwardly into blowing relation with the molds, and lifted therefrom, by cylinders 149.

When the blowheads are in blowing position, air under pressure enters the glass parisons in the blow molds, and blows them to the form of the completed article. It is often desirable to subject the articles to a second blowing operation, and for that purpose there is provided a second blow station. At this second station there are two blowheads 148', operated by two cylinders 149'. These blowheads and cylinders are indicated in Figure 1, but as the blowhead arrangement at the second station is the same as at the first station, it is only necessary to describe the first station. Of course the pressure of the blowing air may be different at the two stations, and cooling wind may be employed at either or both stations. In instances where a second blow is not necessary, the blowing equipment can of course be rendered inoperative.

Prior to the blowing operation the blow molds and neck rings should be firmly locked to prevent the formation of seams at the blow station. For this purpose a small cylinder 150 is provided adjacent each blow mold, at the first blow station; the cylinders being mounted on a stationary plate 151. Similar cylinders 150' are provided at the second blow station, and are mounted on a plate 151'.

When the pistons of the cylinders are moved inward they cause clamps 152 and 152' to firmly grip lugs 84 on the neck ring cages and lugs 153 on the blow mold cages. Of course any desired mechanism may be employed for operating the clamps by the cylinders, such as the ordinary mechanism 83 shown in Figure 5. The neck rings and blow molds are thus maintained locked during the blowing operations, and of course by the admission of air pressure to the inner ends of the cylinders their pistons are operated to release the clamps when the blowing operation is completed.

The air pressure for operating cylinders 149, for lowering the blowheads to blowing position, and the air pressure for operating cylinders 150, to lock the neck rings and blow molds, come from the same line, and another single line causes the blowheads to be lifted and the neck rings and blow molds to be unlocked. The arrangement by which this is effected, and by which the blowhead cylinders and the locking cylinders can be operated in the sequence desired, will now be described, reference being had to Figure 1. This arrangement of air lines, etc., is shown only in connection with the first blow station, and of course the description is therefore limited to that station, but it will be understood that the same arrangement is employed at the second blow station.

Lines 154 and 155 lead from the timer 27 to the opposite ends of a spool valve 156, to shift the valve back and forth in proper timed relation with the operation of the machine. When the valve is in one position air pressure is admitted from the main air line 157 to a line 158, and when the valve is in the opposite position air pressure is admitted from the main air line to a line 159. It will be understood, of course, that when air pressure is being delivered through one of the lines 158 and 159 to the cylinders, it is being drawn from the opposite ends of the cylinders through the other of such lines, and being exhausted to the atmosphere through a port (not shown) in the spool valves, which valves are old and well known in the art.

The line 158 has four branches, two of which, indicated by numerals 170 and 171, lead to the upper ends of the two blowhead cylinders 149, and the other two of which, indicated by numerals 172 and 173, lead to the outer ends of the two mold locking cylinders 150. In each of these branch lines there is provided a by-pass valve 160. The line 159 likewise has four branches leading to the lower ends of the blowhead cylinders and to the inner ends of the mold locking cylinders. And each of these four branches, indicated by numerals 174, 175, 176 and 177, is similarly provided with a by-pass valve 161.

Thus when the timer 27 causes air pressure to enter line 158, the blowheads are moved down to blowing position and the blow molds and neck rings are locked, and when air pressure enters line 159, the blowheads will be lifted and the blow molds and neck rings will be unlocked.

The blowing operation necessarily occurs very quickly, and it is very important that the neck rings and blow molds be locked before the blowing occurs. By the simple adjustment of the various by-pass valves in the branch lines of lines 158 and 159, the operator is able to effect the locking of the two blow molds and neck rings an instant prior to the blowing, and also to lift the two blowheads an instant prior to the unlocking of the blow molds and neck rings. Also by means of these by-pass valves the blow heads may be caused to move in exact unison, if for any reason they were not so moving.

The first blowing operation having been completed, the movement of the machine carries the molds to the second blow station. During this movement the blow molds and neck rings are maintained closed by the cams, as hereinbefore described, and when they reach the second blow station they are locked and blown as at the first station, if desired.

The fabrication of the two articles is now completed, and the movement of the machine carries the unit to the take-out station. At this station the neck rings and blow molds are quickly opened, and the articles are removed by the take-out devices 162, of any desired type. As the machine rotates from the take-out station the blow mold bottoms are quickly snapped outwardly to their inoperative position, so that the parison molds can be lifted at the next station, to start another cycle of operation of the unit.

In connection with the above description of the construction of the machine, the operation thereof has also been fully explained, and further description of the operation seems unnecessary.

From the foregoing description it will be apparent that this press and blow machine of the telescoping mold type is wholly automatic, and that by the simultaneous manufacture of two glass articles, the rate of production is greatly increased.

It will also be apparent from the above description that the machine is capable of simultaneously manufacturing two glass articles of widely different weights and shapes.

It will also be understood that the efficiency of the glass tanks is improved by the present invention, for the number of machines about a given tank is fixed, and by the great increase in production per machine, it is possible to operate the tanks at full capacity.

While the machine has been described in considerable detail, it is to be understood that various changes and modifications may be made without departing from the spirit of the invention, and all such changes and modifications are intended to be included within the scope of the appended claims.

What I claim is:

1. A rotatable glass forming machine including a plurality of forming units travelling with the machine, each unit including a pair of neck rings, a pair of parison molds, a pair of blow molds, and a pair of blow mold bottoms, means for elevating a pair of parison molds simultaneously to the level of the neck rings, means for pressing parisons simultaneously in the two parison molds, two anvils at the pressing station for supporting the parison molds during the pressing operation as the pairs of parison molds of said units successively reach the pressing station, and means for periodically moving one of the anvils into and out of operative position.

2. A rotatable glass forming machine including a plurality of forming units travelling with the machine, each unit including a pair of neck rings, a pair of parison molds, a pair of blow molds, and a pair of blow mold bottoms, means for elevating a pair of parison molds simultaneously to the level of the neck rings, means for pressing parisons simultaneously in the two parison molds, two anvils at the pressing station for supporting the parison molds during the pressing operation as the pairs of parison molds of said units successively reach the pressing station, means for lowering the parison molds simultaneously from the neck rings, and means for periodically moving one of the anvils out of the path of the descending parison molds.

3. A glass forming machine, means for rotating the machine step by step, said machine including a plurality of forming units travelling with the machine, each unit including a pair of neck rings, a pair of parison molds, a pair of blow molds, and a pair of blow mold bottoms, each parison mold unit including a yoke mounted for vertical sliding movement and carrying the two parison molds, a finger extending outwardly from said yoke, a fluid motor positioned at the parison mold lifting station, an inwardly extending bracket carried by the piston rod of the motor, said finger adapted to project over said bracket at the mold lifting station, whereby the operation of the motor elevates the two parison molds simultaneously to the level of the neck rings, a track for maintaining the parison molds in elevated operative position, a pair of pressing plungers at the parison pressing station, fluid motors for operating the plungers to press the parisons, anvils for supporting the parison molds during the pressing operation, the parison molds being lowered from cooperative relation with the neck rings by said track, and one of said anvils being movable out of the path of the descending parison molds.

4. An intermittently rotated glass forming machine including a plurality of forming units travelling with the machine, each unit including a pair of neck rings, a pair of parison molds, a pair of blow molds, and a pair of blow mold bottoms, means for elevating a pair of parison molds to the level of the neck rings, means for closing the neck rings into cooperative relation with the parison molds, means for pressing the glass parisons simultaneously, a pair of blowheads at the blowing station, two fluid motors for moving the blowheads to operative position to blow the parisons, and a second pair of blowheads at a second blowing station and two fluid motors for operating the blowheads for a second blowing operation.

5. A rotatable glass forming machine including a plurality of forming units travelling with the machine, each unit including a pair of neck rings, a pair of parison molds, a pair of blow molds, and a pair of blow mold bottoms, means for elevating a pair of parison molds to the level of the neck rings, means for closing the neck rings into cooperative relation with the parison molds, means for pressing the glass parisons simultaneously, means for lowering the parison molds, means for closing the blow molds, fluid motor operated clamps for locking the blow molds in closed position, fluid motor operated blowheads for blowing the glass parisons, a fluid pressure line having branches leading to the clamp operating motors and branches leading to the blowhead operating motors, and valves in the branches for causing the blow molds to be locked before the parisons are blown.

6. A rotatable glass forming machine including a plurality of forming units travelling with the machine, each unit including a pair of neck rings, a pair of parison molds, a pair of blow molds, and a pair of blow mold bottoms, means for elevating a pair of parison molds to the level of the neck rings, means for closing the neck rings into cooperative relation with the parison molds, means for pressing the glass parisons, means for lowering the parison molds, means for closing the blow molds about the glass parisons, two blowheads for blowing the glass parisons, two fluid motors for operating the blowheads, and valves associated with the motors for causing the simultaneous operation of the blowheads.

7. A rotatable glass forming machine including a plurality of forming units travelling with the machine, each unit including a pair of neck rings, a pair of parison molds, a pair of blow molds, and a pair of blow mold bottoms, means for elevating a pair of parison molds to the level of the neck rings, means for closing the neck rings into cooperative relation with the parison molds, means for charging the molds simultaneously, two plungers for pressing the glass parisons, two fluid motors fixed at the pressing station for operating the pressing plungers, and valves associated with the motors for causing the simultaneous operation of the pressing plungers.

8. A rotatable glass forming machine including a plurality of forming units travelling with the machine, each unit including a pair of neck rings, a pair of parison molds, a pair of blow molds, and a pair of blow mold bottoms, means for elevating a pair of parison molds to the level of the neck rings, a radially movable slide associated with each neck ring, a yoke member connecting two neck ring slides, a fluid motor for opening the neck rings, and means for operatively connecting the motor and each yoke member successively.

9. A rotatable glass forming machine including a plurality of forming units travelling with the machine, each unit including a pair of neck rings, a pair of parison molds, a pair of blow molds, and a pair of blow mold bottoms, means for elevating a pair of parison molds to the level of the neck rings, a radially movable slide associated with each neck ring, a yoke member connecting two neck ring slides, a lever for opening the neck rings successively engaging each yoke member, and a fluid motor for operating said lever.

10. A rotatable glass forming machine including a plurality of forming units travelling with the machine, each unit including a pair of neck rings, a pair of parison molds, a pair of blow molds, and a pair of blow mold bottoms, means for elevating a pair of parison molds to the level of the neck rings, means for opening and closing the neck rings, a radially movable slide associated with each blow mold, a yoke member connecting two blow mold slides, a fluid motor for opening the blow molds, means for operatively connecting said motor and each yoke member successively, a second fluid motor for closing the blow molds, and means for operatively connecting said second motor with each yoke member successively.

11. A rotatable glass forming machine including a plurality of forming units, each unit including a pair of neck rings, a pair of parison molds, a pair of blow molds, and a pair of blow mold bottoms, means for elevating a pair of parison molds to the level of the neck rings, means for opening and closing the neck rings, a radially movable slide associated with each blow mold, a yoke member connecting two blow mold slides, means successively engaging each yoke member for opening the blow molds, a movably mounted cam section successively engaging each yoke member, and a fluid motor for periodically moving the cam section to close the blow molds.

12. An intermittently rotated glass forming machine including a plurality of forming units travelling with the machine, each unit including a pair of neck rings, a pair of parison molds, a pair of blow molds, and a pair of blow mold bottoms, means for elevating a pair of parison molds simultaneously to the level of the neck rings while the machine is stationary, two pressing plungers located at the pressing station, fluid motors for operating the pressing plungers simultaneously to press the parisons as the pairs of parison molds of said units successively reach the pressing station, two blowheads located at the blowing station, and fluid motors for simultaneously operating the blowheads as the pairs of blow molds of said units successively reach the blowing station.

JOHN W. CARNAHAN.